United States Patent [19]

Mason

[11] 4,338,857

[45] Jul. 13, 1982

[54] ROTARY ACTUATOR FOR VALVE

[75] Inventor: Edward M. Mason, St. Louis, Mo.

[73] Assignee: Lee Engineering, Inc., St. Louis, Mo.

[21] Appl. No.: 168,571

[22] Filed: Jul. 14, 1980

[51] Int. Cl.[3] ........................ F01B 7/00; F16K 31/122

[52] U.S. Cl. ........................................ 92/62; 74/25; 92/68; 92/129; 251/58; 251/62; 251/229; 251/251

[58] Field of Search ...................... 92/138, 62, 68, 129; 74/25; 251/62, 58, 229, 251

[56] References Cited

U.S. PATENT DOCUMENTS

| | | | |
|---|---|---|---|
| 1,119,758 | 12/1914 | Kings | 92/138 |
| 1,229,443 | 6/1917 | Hall et al. | 92/138 |
| 1,517,728 | 12/1924 | Heath | 251/58 |
| 2,190,228 | 2/1940 | Bowen | 92/129 |
| 3,261,266 | 7/1966 | Ledeen et al. | 92/138 |
| 3,709,106 | 1/1973 | Shafer | 251/58 |
| 3,824,901 | 7/1974 | Shafer | 92/138 |
| 3,958,493 | 5/1976 | Fujita et al. | 92/62 |
| 4,094,231 | 6/1978 | Carr | 251/58 |

FOREIGN PATENT DOCUMENTS

| | | | |
|---|---|---|---|
| 561264 | 4/1957 | Italy | 92/138 |
| 39-19053 | 7/1964 | Japan | 92/138 |

*Primary Examiner*—George L. Walton
*Attorney, Agent, or Firm*—Cohn, Powell & Hind

[57] ABSTRACT

This valve actuator is primarily intended for use with rotary cut-off valves. It includes a housing which is attached to the valve body for receiving the valve stem and a longitudinal passage slidably mounting opposed piston elements. The piston elements include spaced shoulders which engage the remote end of a radial arm mounted within the housing and attached to the stem for rotating said stem. The radial arm includes a cam at the remote end having opposed cam faces alternately engaged by the piston elements and configurated to provide a minimum gap between the cam and the piston shoulders during the rotation of the valve between open and closed positions.

4 Claims, 6 Drawing Figures

ROTARY ACTUATOR FOR VALVE

BACKGROUND OF THE INVENTION

This invention relates generally to an actuator for rotating a shaft and particularly to a valve actuator for rotating the stem of a cut-off valve.

Rotary valves are used in a wide variety of fluid flow control systems ranging from gas control systems to liquid herbicide spray control systems. It is frequently necessary to actuate such valves remotely and typically this is achieved by the use of hydraulic actuators. Several devices of this kind exist in the prior art but in general they appear to be either complicated, expensive or both and there is a need for an effective simple and inexpensive valve actuator of this type.

Several of the known actuators utilize a hydraulically actuated piston mechanically connected to the valve stem. One device, described in U.S. Pat. No. 4,034,958, provides a rack and pinion type of connection between the piston and valve stem and requires a sequential venting and damping system. Another, earlier device, disclosed in U.S. Pat. No. 1,067,414 provides a valve actuator arm connected to the valve stem and operated by a sliding piston which is slotted to receive the arm. The former device is relatively complicated mechanically and the latter suffers from the inherent disadvantage of having a significant amount of play between the moving parts during reversal action.

The present device overcomes these and other disadvantages in a manner not disclosed in the known prior art.

SUMMARY OF THE INVENTION

This valve actuator is intended primarily for use with rotary valves and permits the valve stem to be rotated to a desired degree with maximum efficiency. The amount of play between the valve and actuator parts in minimized thereby providing for substantially instantaneous valve operation.

This invention provides an actuator for rotating a valve stem, the actuator including a housing having passage means providing opposed ends each end having fluid inlet and outlet means; piston means slidingly mounted in the passage for reciprocative movement between the opposed ends of the passage means, the piston means including a recessed portion having shoulders disposed in axially spaced relation from each other; and a radial arm attached to the valve stem for rotation of said stem, the arm including a shoulder-engagable, substantially symmetrical cam means at the remote end, said cam means having opposed cam faces configurated so that the overall distance across the cam faces adjacent corresponding shoulders during rotary movement of the arm is substantially equal to the distance between the shoulders.

In one aspect of the invention, the piston means includes opposed independent piston elements each having a reduced diameter inner portions defining an annular cam-engageable shoulder.

In another aspect of the invention, the housing includes a first body portion providing the passage means, a second body portion attached to the first body portion and receiving the valve stem and the attached end of the radial arm, the first body portion including an opening communicating with the passage means and receiving the cam at the end of the radial arm.

In yet another aspect of the invention, the housing first body portion is formed from a block; the second body portion is formed from sheet material and a mounting plate connects the first and second body portions.

In still another aspect of the invention the valve body is operatively connected to the mounting plate.

In another aspect of the invention the housing is formed from a block including a generally cylindrical end passage portion and an intermediate cavity portion, said cavity defining a partially cylindrical portion communicating with said end passage portions and having a cover plate; said cavity receiving the valve stem and the attached end of the valve arm, and the valve arm being offset to engage the annular shoulders on the side thereof between the cover plate and the axis of the pistons.

In another aspect of the invention the cam means at the end of the radial arm is substantially arrow-shaped.

DESCRIPTION OF THE PREFERRED EMBODIMENT

Figure 1:
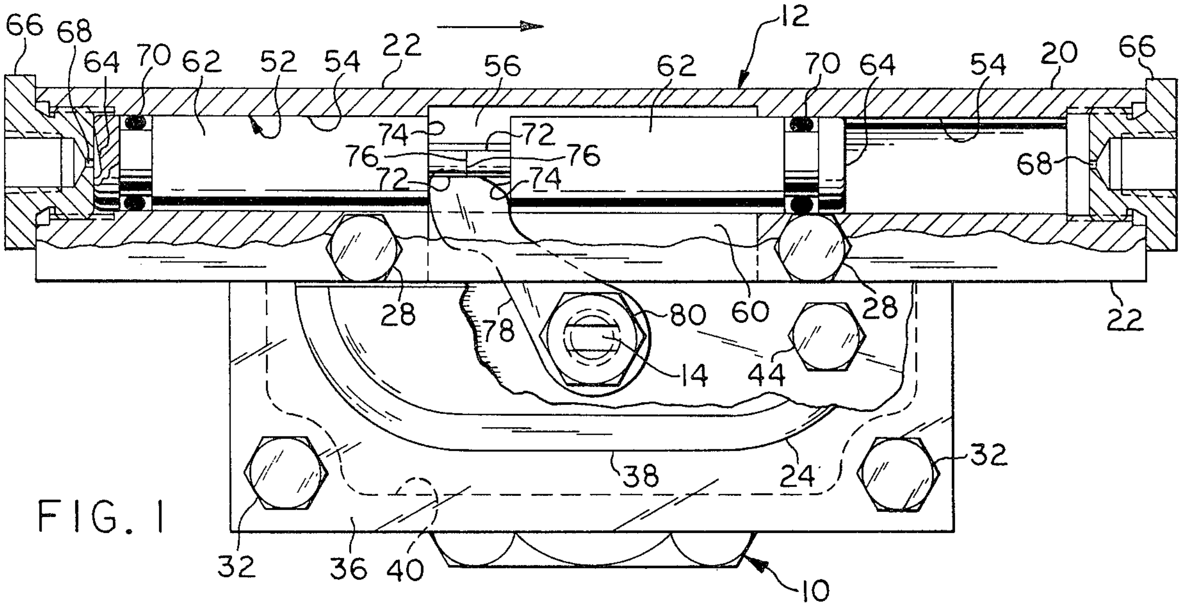
FIG. 1 is an elevational view of the valve actuator and valve assembly.
Figure 2:
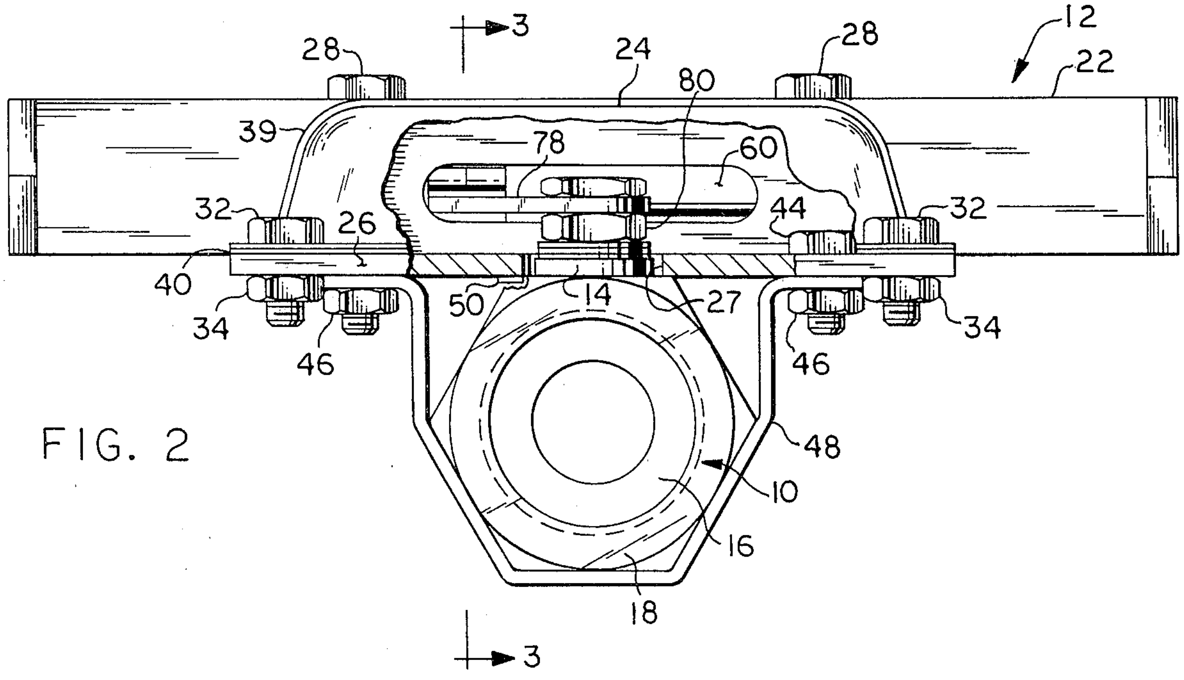
FIG. 2 is a plan view of the underside of said assembly.
Figure 3:
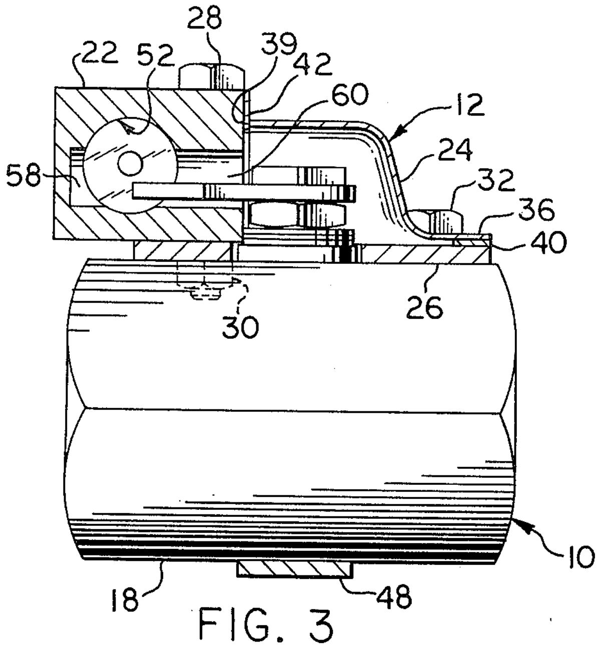
FIG. 3 is a cross sectional view taken on line 3—3 of FIG. 2.

Referring now by reference numerals to the drawings and first to FIGS. 1-3 it will be understood that the valve actuator and valve assembly includes a valve 10 which, in the embodiment shown is a ball valve, and an attached valve actuator 12. As will be readily understood by the description which follows, the actuator 12 provides the means by which the valve stem 14, which constitutes a rotatable shaft, is rotated to move the ball valve element 16, which is mounted in the valve body 18, from a closed position to the open position shown in FIG. 2.

The valve actuator 12 includes a two-part housing 20. In the embodiment shown, the housing 20 includes a block 22 providing a first body portion; a shell-like cover 24, formed from sheet material and providing a second body portion, and a mounting plate 26. As shown in FIG. 3, the block 22 is attached to the mounting plate 26 by fastener means including bolts 28, which extend transversely through the body 22 and the mounting plate 26, and nuts 30. The cover 24 is attached to the mounting plate 26 by fastener means including bolts 32, which extend through the cover peripheral flange portion 36 and the mounting plate 26, and nuts 34. In the preferred embodiment gaskets, generally indicated by numerals 40 and 42 respectively in FIG. 1, are provided between the peripheral flange 36 and the mounting plate 26 and between the cover rim 39 and the body 22.

The valve 10 is also attached to the mounting plate by fastener means including bolts 44, which extend through a support strap 48 disposed around the valve body 18, and the mounting plate 26, and nuts 46. In the embodiment shown, the mounting plate 24 includes upper and lower spaced dimple-like extrusions 50 which engage the valve body 18 to preclude rotation of said body relative to said mounting plate. Also, as shown in FIG. 2, the mounting plate 26 includes an opening 27 receiving the valve stem 14.

As best shown in FIGS. 1 and 3, the housing body 22 includes a passage means 52 extending between the ends thereof. The passage means 52 includes generally cylindrical end portions 54 and an intermediate portion 56, said intermediate portion having outwardly extending portions 58 and 60 as best shown in FIG. 3. Portion 60 provides an opening communicating with the interior of the cover 24 for purposes which will now be described.

Mounted within the passage means 52 are oppositely disposed piston elements 62, which together constitute piston means. Each piston element includes a concave outer end 64, which provides a pressure face receiving fluid from a metering orifice 68 provided in an end fitting 66 threadedly connected to the housing body, said orifice constituting inlet and outlet means. Each piston element 62 also includes a sealing ring 70, adjacent the outer end 64, and a reduced portion 72 at the inner end. The reduced portions 72 cooperate to provide the piston means with a recessed portion and define spaced annular shoulders 74. In the embodiment shown, the ends 76 of the reduced portions 72 are directly engageable so that the piston elements can move in unison.

Figure 6:
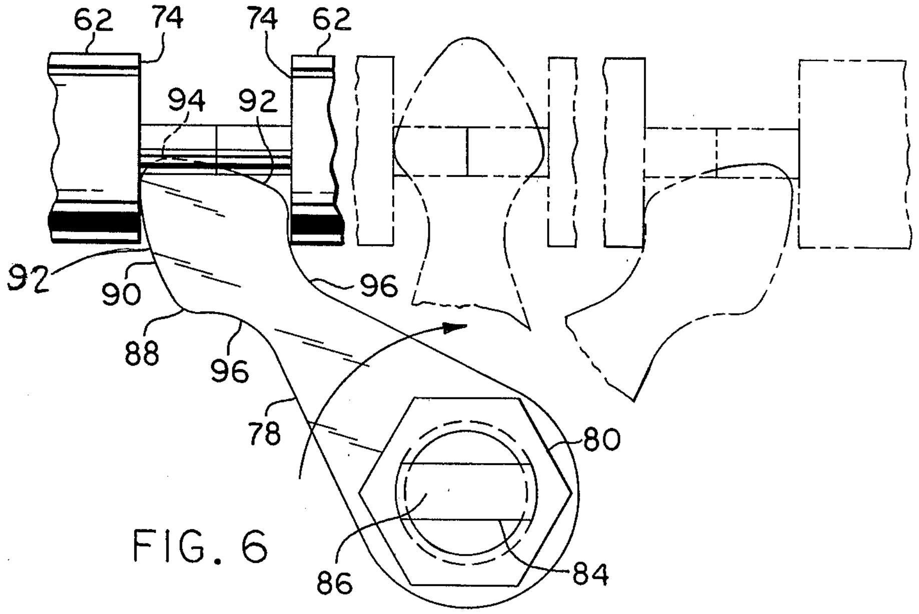
FIG. 6 is an enlarged fragmentary view of the valve actuator arm.

As shown in FIG. 6, each of the piston elements 62 is engageable with the remote end of a radial arm 78. The inner end of the radial arm 78 is connected to the valve stem 14, as by a nut and washer assembly 80, said arm including a generally rectangular opening 84 which receives the reduced, flattened threaded portion 86 of said stem 14. The remote end of the radial arm 78 includes a cam 88 constituting cam means and having opposed, substantially symmetrical cam faces 90. The shape of the cam 88 is generally in the form of the snake head, more properly the head of a poisonous snake, in that it contains "necked-in" or re-entrant portions. This particular cam shape can also be considered as being generally similar to a rounded arrow head and will be referred to as an arrow-head cam for convenience.

More specifically, the cam faces 90 define the arrow-head cam 88 and include a rounded outer end 94 and re-entrant neck portions 96. The arrow-head cam 88 is configurated so that during the ninety degree (90°) rotational movement of the radial arm 78, one of the cam faces 90 remains in engagement with an adjacent shoulder 74 of a pressurized piston element while the other cam face 90 remains closely adjacent the other shoulder 74. To this end, the distance between the point of engagement of one cam face 90 and the closest adjacency of the other cam face 90 is substantially equal to but slightly less than the distance between the shoulder spacings. Because of this structural arrangement of parts the piston element 62, to which pressure is being applied, engages the other piston element 62, as well as the cam 88, during the sliding movement of its stoke length without engagement of said other piston element by said cam. During the return stroke the situation is reversed and because of the minimized nature of the gap between the right hand return piston element 62 and the cam 88 there is virtually no play between these parts and the valve movement is essentially instantaneous.

Figure 4:
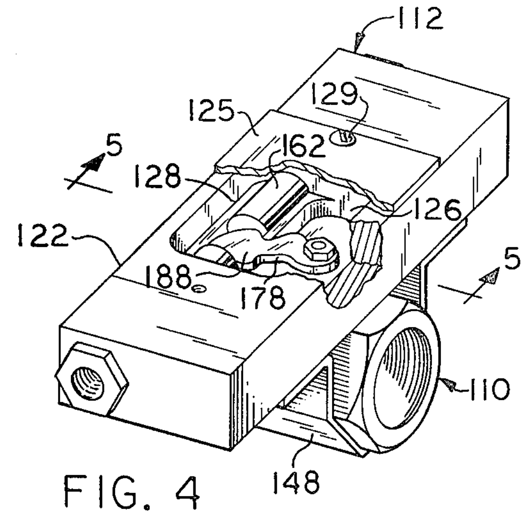
FIG. 4 is a perspective view of a modified valve actuator and valve assembly.
Figure 5:
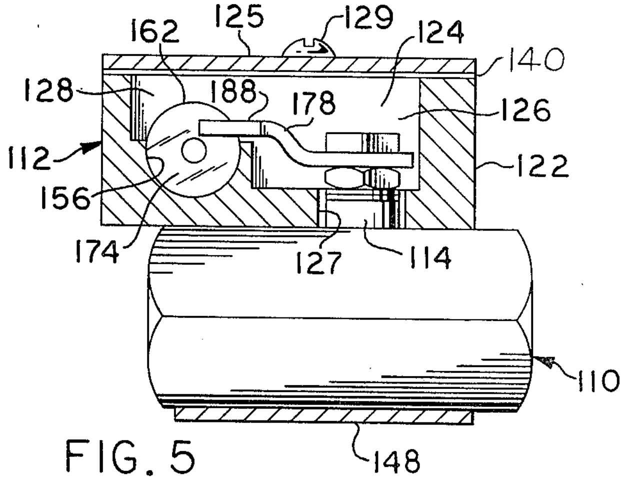
FIG. 5 is a cross sectional view taken on line 5—5 of FIG. 4.

Referring now to the modified valve actuator and valve assembly shown in FIGS. 4 and 5, it will be understood that the actuator 112 includes a housing formed from a single block 122. The block 122 includes end passage portions 154 substantially similar to those described in the foregoing device. The valve 110 is also similar but, as shown, is smaller. However, this is exemplary only and serves to demonstrate the versatility of the invention as a whole. In place of the shell-like cover, the actuator 112 is provided with an interior cavity 124. As shown in FIG. 5, the cavity 124 includes a lower portion 126, which accommodates the valve stem 114 and also the attached portion of the radial arm 178 and the cavity has a length sufficient to accommodate movement of said arm. The housing block 122 also includes an opening 127 receiving the valve stem 114. The upper cavity portion 128 defines a partially cylindrical intermediate passage portion 156 communicating with cylindrical end passage portions 154. In the embodiment shown, the intermediate passage portion 156 is provided with a circumference in excess of one hundred-eighty degrees (180°) to provide a retainer for piston elements 162 during travel through the intermediate portion of the housing.

The radial arm 178 of the modified actuator is substantially similar to that described in the first species except that it is cranked so that the arrow-head cam 188 engages the shoulder 174 on the other side thereof i.e. between the cavity cover 125 and the axis of movement of the piston elements 162. The cover 125 is attached to the housing block 112, as by bolts 129 received within threaded openings (not shown), extending through the housing block 122, said threaded openings also receiving similar bolts at their other end to connect the valve support strap 148 to the housing block 122. A gasket 140 is provided.

In other respect the structure and operation of the modified valve actuator and valve assembly is essentially similar to that described in the foregoing species.

It is thought that the structural features and functional advantages of this valve actuator and valve assembly have become fully apparent from the foregoing description of parts, but for completeness of disclosure the operation and installation of the device will be briefly described with reference to the first embodiment. However, it will be understood that the actuator is not limited to use with a ball valve having a rotatable shaft but can be used with other types of rotatable valve elements such as butterfly valves, and for actuating the rotatable shafts of other types of control mechanisms.

The valve 10 shown in FIGS. 1–3 is a ball valve, which is conventional and is of the type commonly used in herbicide spray systems, for example. This valve, which is available in several different sizes, includes an outwardly extending stem 14 and said stem is inserted within the central opening 27 of the mounting plate 26, and attached to said mounting plate as by nut and bolt assembly 44,46. The radial arm 78 is attached to the valve stem 14 and the housing body 22 is also bolted to the mounting plate by nut and bolt assembly 28,30. As shown in FIG. 3, the arm 78 is received within the opening provided by the outwardly extending intermediate passage portion 60. The piston elements 62 may be emplaced within the housing during this procedure or emplaced within the housing immediately thereafter, following which the fittings 66 are disposed within the passage ends. When this is accomplished, the cover 24 is bolted to the mounting plate by bolt assemblies 32,33 and the valve actuator and valve assembly unit is ready for connection to each fitting 66 from a remote reservoir and hydraulic fluid control (not shown). Finally, the fluid supply, which is to be controlled by the ball valve 10 is connected to said valve and the assembly is operational.

In operation, if it is desired to rotate the radial arm 78 shown in FIG. 1, through ninety degrees (90°) to move the ball element 16 from the open position shown, to a closed position, hydraulic fluid is admitted into the left hand metering orifice 68, adjacent the closest piston end 64, so that the associated piston element 62 moves to the right. As the piston moves to the right the associated shoulder 74 engages the nearest cam face 90 and rotates the radial arm 78 until the piston end 64 engages the other fitting 66 which acts as a stop means. Because of the engagement between the piston reduced inner ends 76, both piston elements move in unison. That is, pressure is transmitted between the piston elements 62 directly, rather than through the medium of the radial arm 68. At the end of the stroke, because of the distance across the cam 88 of the radial arm 78 is substantially equal to the spacing between the shoulders 74, the other cam face 90 is substantially in contact with the shoulder 74 adjacent that cam face. Thus, when fluid is admitted into right hand metering orifice of the fitting 66 to transmit pressure to the outer end of the other piston element 62 to commence the return stroke there is virtually no take up movement required between that piston element and the cam 88. In the preferred embodiment the maximum gap between the shoulders and the cam is of the order of ten-twelve thousandths inch (0.010"-0.012") which significantly reduces any peening effect between those parts, even after repeated operation.

The use of two piston elements 62 results in a superior sliding action during reciprocative movement of the piston elements because of the reduced length of each piston element relative to the length of the overall passage means. Further, the structural arrangement of parts does not require substantial take up between the piston elements, because of the related configuration of the cam and the space in between the shoulders, and play between the parts of the internal mechanism as a whole is minimized.

The amount of rotation induced into the valve stem 14 is a function of the length of the radial arm 78 and the stroke of the piston elements 62. Accordingly, although in the embodiment shown a rotational movement of ninety degrees (90°) is contemplated, the amount of such movement can be selected within a wide range by varying the stroke of the piston elements 62 or the length of the radial arm 78.

The unique shape of the camming face 90 is such that the initial movement of the cam-engaged piston develops maximum torque in the radial arm 78 and the torque is diminished as the piston element continues its travel. The configuration of the camming surface utilizes minimum piston travel to achieve from one degree (1°) to ninety degrees (90°) of rotation of the cam actuator arm and, of course, the system operates in either direction.

I claim as my invention:

1. An actuator for rotating a shaft, the actuator comprising:

(a) a housing including passage means having opposed ends, each end having fluid inlet and outlet means, (b) piston means slidingly mounted in the passage means for reciprocative movement between the opposed ends of the passage means, said piston means including a pair of opposed, unconnected independent piston elements having cam-engageable inner end portions disposed in spaced relation axially of said piston means and having interengageable inner ends for moving the piston elements in unison, and (c) a radial arm attached to the shaft for rotation thereof, said arm including a substantially symmetrical cam means at the remote end, said cam means having opposed cam faces, and said cam means being configurated so that the overall distance across the cam faces adjacent corresponding cam-engageable inner end portions, during rotary movement of the arm, is less than the distance between the cam-engageable inner end portions, whereby when any one cam face engages an adjacent inner end portion, a gap is created between the other cam face and an adjacent inner end portion as the piston elements are moving in unison, wherein pressure is transmitted between the piston elements directly rather than through the medium of the radial arm by virtue of said gap.

2. An actuator as defined in claim 1, in which: the piston elements each have a fluid pressure-receiving end and a reduced diameter end, said reduced diameter end defining an annular shoulder providing the cam-engageable inner end portion and said reduced diameter end of one element being engageable with the reduced diameter end of the other element to define the spacing between said annular shoulders.

3. An actuator as defined in claim 1, in which:

(d) the inner end portions are substantially annular, and (e) the piston elements each include outer fluid receiving ends of substantially concave configuration.

4. An actuator as defined in claim 1, in which: the overall distance across the cam faces is substantially equal to but less than the distance between said inner end portions, wherein when any one cam face engages one of the adjacent inner end portions, the gap between the other cam face and the other adjacent inner end portion minimizes lost-motion.

* * * * *